US008196595B2

(12) United States Patent
Chester et al.

(10) Patent No.: US 8,196,595 B2
(45) **Date of Patent: *Jun. 12, 2012**

(54) SAFETY OVERRIDE CIRCUIT FOR PNEUMATIC POSITIONER AND METHOD OF USE THEREOF

(75) Inventors: Mark Chester, Tiverton, RI (US); Peter S. Levesque, Norwood, MA (US); Alex Legere, Marshfield, MA (US)

(73) Assignee: Dresser, Inc., Addison, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/691,473

(22) Filed: Jan. 21, 2010

(65) Prior Publication Data

US 2010/0116347 A1 May 13, 2010

Related U.S. Application Data

(63) Continuation of application No. 11/348,572, filed on Feb. 7, 2006, now Pat. No. 7,661,439.

(51) Int. Cl.
*F16K 31/02* (2006.01)

(52) U.S. Cl. ........... 137/1; 137/82; 137/487.5; 137/488; 251/30.01; 251/129.04

(58) Field of Classification Search ............... 137/487.5, 137/488, 82, 83, 1; 251/30.01, 129.04
See application file for complete search history.

(56) References Cited

U.S. PATENT DOCUMENTS

| | | | |
|---|---|---|---|
| 2,766,731 A | 10/1956 | Brandes et al. | |
| 3,831,495 A | 8/1974 | Arnold et al. | |
| 5,329,956 A | 7/1994 | Marriott et al. | |
| 6,112,638 A | 9/2000 | Loechner | |
| 6,354,327 B1 | 3/2002 | Mayhew | |
| 6,696,882 B1 | 2/2004 | Markowski et al. | |
| 6,804,618 B2 | 10/2004 | Junk | |
| 6,957,127 B1 | 10/2005 | Smart | |
| 7,661,439 B2 * | 2/2010 | Chester et al. | 137/487.5 |
| 2001/0032518 A1 * | 10/2001 | Boger et al. | 73/861 |
| 2001/0035512 A1 | 11/2001 | Messer et al. | |
| 2003/0098069 A1 | 5/2003 | Sund et al. | |
| 2004/0159354 A1 * | 8/2004 | Cederstav et al. | 137/487.5 |
| 2006/0260702 A1 | 11/2006 | Levesque et al. | |
| 2006/0273776 A1 | 12/2006 | Smart et al. | |

OTHER PUBLICATIONS

PCT Invitation to Pay Additional Fees, PCT/US2007/003218, Jun. 27, 2007, 4 pages.
International Search Report and Written Opinion of the International Searching Authority, PCT/US2007/003218, Nov. 7, 2007, 17 pages.
International Preliminary Report on Patentability, PCT/US2007/003218, Jun. 2, 2008, 11 pages.

* cited by examiner

*Primary Examiner* — John Rivell
*Assistant Examiner* — William McCalister
(74) *Attorney, Agent, or Firm* — Woodcock Washburn LLP

(57) ABSTRACT

Systems and processes may provide improved performance for a pneumatic positioner during a safety override. In certain implementations, a system and process may include may include the ability to receive an input control signal, power control circuitry of the pneumatic positioner using the input control signal, and generate a control signal for a signal-to-pressure converter with the control circuitry based at least partially on the input control signal. The system and process may also include the ability to detect an unsafe operating condition for the pneumatic positioner based on an input signal and modify the control signal in response to detecting the unsafe operating condition, to cause the converter to transition to a safe state. The system and process may additionally include the ability to allow the control circuitry to continue being powered by the input control signal while the converter is in the safe state.

26 Claims, 3 Drawing Sheets

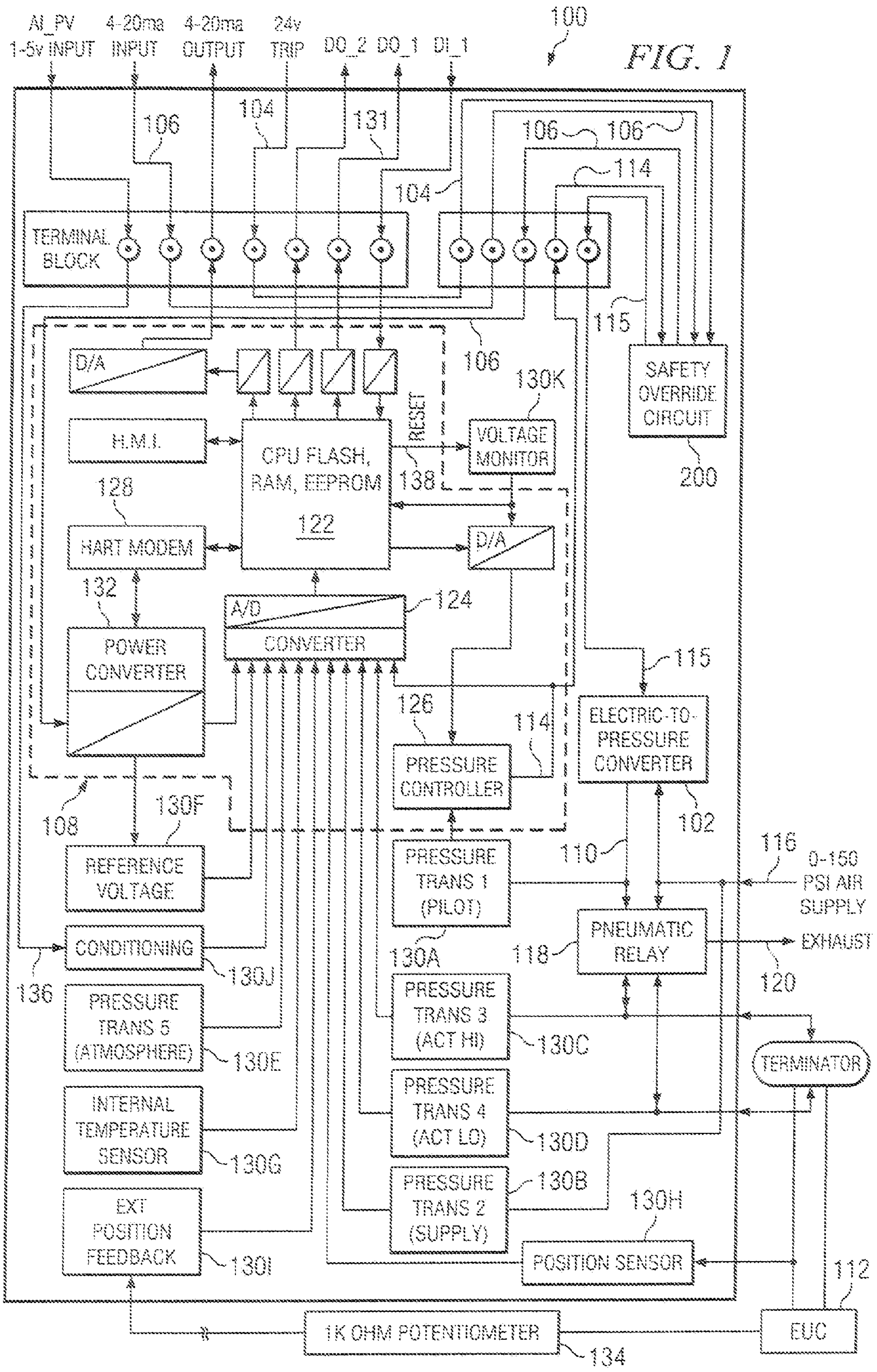

FIG. 1
100
AI_PV 1-5v INPUT
4-20ma INPUT
4-20ma OUTPUT
24v TRIP
DO_2
DO_1
DI_1
TERMINAL BLOCK
D/A
H.M.I.
CPU FLASH, RAM, EEPROM
122
RESET
VOLTAGE MONITOR
130K
138
HART MODEM
128
D/A
A/D
CONVERTER
124
132
POWER CONVERTER
126
PRESSURE CONTROLLER
114
SAFETY OVERRIDE CIRCUIT
200
ELECTRIC-TO-PRESSURE CONVERTER
115
102
110
116
0-150 PSI AIR SUPPLY
PNEUMATIC RELAY
118
EXHAUST
120
108
REFERENCE VOLTAGE
130F
CONDITIONING
130J
136
PRESSURE TRANS 5 (ATMOSPHERE)
130E
INTERNAL TEMPERATURE SENSOR
130G
EXT POSITION FEEDBACK
130I
PRESSURE TRANS 1 (PILOT)
130A
PRESSURE TRANS 3 (ACT HI)
130C
PRESSURE TRANS 4 (ACT LO)
130D
PRESSURE TRANS 2 (SUPPLY)
130B
TERMINATOR
POSITION SENSOR
130H
1K OHM POTENTIOMETER
134
EUC
112
104
106
131

SAFETY OVERRIDE CIRCUIT FOR PNEUMATIC POSITIONER AND METHOD OF USE THEREOF

CROSS-REFERENCE TO RELATED APPLICATION

This application is a continuation application of and claims priority to U.S. application Ser. No. 11/348,572, filed on Feb. 7, 2006, now U.S. Pat. No. 7,661,439, issued on Feb. 16, 2010, the entire disclosure of which is incorporated herein by reference.

TECHNICAL FIELD

This disclosure generally relates to pneumatic devices and, more specifically, to pneumatic positioners.

BACKGROUND

Pneumatic devices are used in a wide variety of commercial and industrial settings. Because of their varied use, pneumatic devices often operate in situations where their operations are critical for safety and/or system operation reasons. Common pneumatic devices include wrenches, lifts, and positioners.

Pneumatic positioners may be used in a wide variety of devices, including pneumatic valves, air flow devices, and the like. During operation, unsafe operating conditions may arise, such as temperature or pressure exceeding safe operating limits. In such instances, it may be desirable to shut down the positioner, which typically includes transitioning the pneumatic positioner into a safe state and removing power from the electronic components. Transitioning the pneumatic position to a safe state may, for example, be accomplished by venting it to the atmosphere when an unsafe operating condition is detected.

SUMMARY

This disclosure describes a shutdown override circuit for a pneumatic positioner and method for use thereof. In one general aspect, a process for implementing a safety override at a pneumatic positioner may include receiving an input control signal, powering control circuitry of the pneumatic positioner using the input control signal, and generating a control signal for a signal-to-pressure converter with the control circuitry based at least partially on the input control signal. The process may also include detecting an unsafe operating condition for the pneumatic positioner based on an input signal, modifying the control signal in response to detecting the unsafe operating condition to cause the converter to transition to a safe state, and allowing the control circuitry to continue being powered by the input control signal while the converter is in the safe state. The process may be implemented by analog circuitry, digital circuitry, or a combination thereof. In certain implementations, the process may additionally include venting an output port of the converter to atmospheric pressure in response to the modified control signal.

Detecting an unsafe operating condition may, for example, include detecting that an input trip signal has activated. In particular implementations, detecting an unsafe operating condition may include detecting that a current level of the input control signal is outside a threshold level. Detecting that a current level of the input control signal is outside a threshold level may include generating a characteristic voltage based on the input control signal, comparing a reference voltage to the characteristic voltage, and determining that the current level of the input control signal has dropped below the threshold level based on the comparison.

The process may also include sensing an unsafe operating condition for the pneumatic positioner and modifying the control signal to transition the converter to a safe state based on the detection.

In another general aspect, a pneumatic positioner may include a converter, control circuitry, and a safety override circuit. The converter may be operable to produce a pressure at an output port in response to a control signal. The control circuitry may be powered using an input control signal and operable to generate the control signal for the converter based at least partially on the input control signal. The safety override circuit may be operable to modify the control signal for the converter in response to an input signal, the modified control signal causing the converter to transition into a safe state and the safety override circuit allowing the control circuitry to continue being powered by the input control signal while the converter is in the safe state. The converter may, for example, transition to the safe state by venting the output port to atmospheric pressure. The control circuitry may be operable to convey and receive digital signals from at least one external device.

Certain implementations may include a valve controlled by the pressure produced by the converter. The safety override circuit may be controlled by an externally generated trip signal and/or the input control signal. The safety override circuit may, for example, include a comparator operable to compare a characteristic voltage representative of the input control signal to a reference voltage.

Particular implementations may include at least one sensor operable to detect an unsafe operating condition for the pneumatic positioner, wherein the control circuitry can modify the control signal to transition the converter to a safe state based on the detection.

In another aspect, a safety override circuit for a pneumatic positioner may include a first input, a second input, and a transistor. The first input may be operable to receive an input signal, and the second input may be operable to receive a control signal for a signal-to-pressure converter. The transistor, which may, for example, be a MOSFET, may include a first terminal, a second terminal, and a third terminal, the first terminal having a voltage determined based on the input signal, the second terminal coupled to the second input, and the third terminal operable to convey an output signal-to-pressure converter signal, wherein the transistor is controllable by the voltage at the first terminal to prevent the control signal from flowing through the transistor to third terminal.

In certain implementations, the circuit may also include at least one resistor having a first resistor terminal coupled to the first terminal of the transistor and a second resistor terminal coupled to the second input. The safety override circuit may additionally include duplicate override circuits, each duplicate override circuit having a respective first input, a respective second input, and a respective transistor.

The input signal may, for example, be an externally generated trip signal and/or an externally generated control signal. The control signal may, for example, be a current generated from the external control signal. The circuit may include a comparator coupled to the transistor and operable to compare a characteristic voltage representative of the input signal current to a reference voltage.

The safety override devices and techniques may reduce or eliminate one or more drawbacks associated with previous systems. For example, the safety override devices and techniques may provide an effective operation for stopping control signals in response to an inappropriate input signal while still maintaining power for the positioner. Thus, the pneumatic device may transition to a safe state without regard to the program and control electronics, which may experience problems due to the improper input signals. However, the program and electronics may also remain operational. The positioner may therefore provide diagnostics and/or status updates while in a shutdown mode. As another example, the safety override devices and techniques may provide redundancy for added security.

The details of one or more implementations are set forth in the accompanying drawings and the description below. Particular features of the disclosure will be apparent from the description and drawings and from the claims.

DESCRIPTION OF DRAWINGS

FIG. 1 is a block diagram illustrating an example implementation of a pneumatic positioner with a safety override circuit;

DETAILED DESCRIPTION

Figure 2:
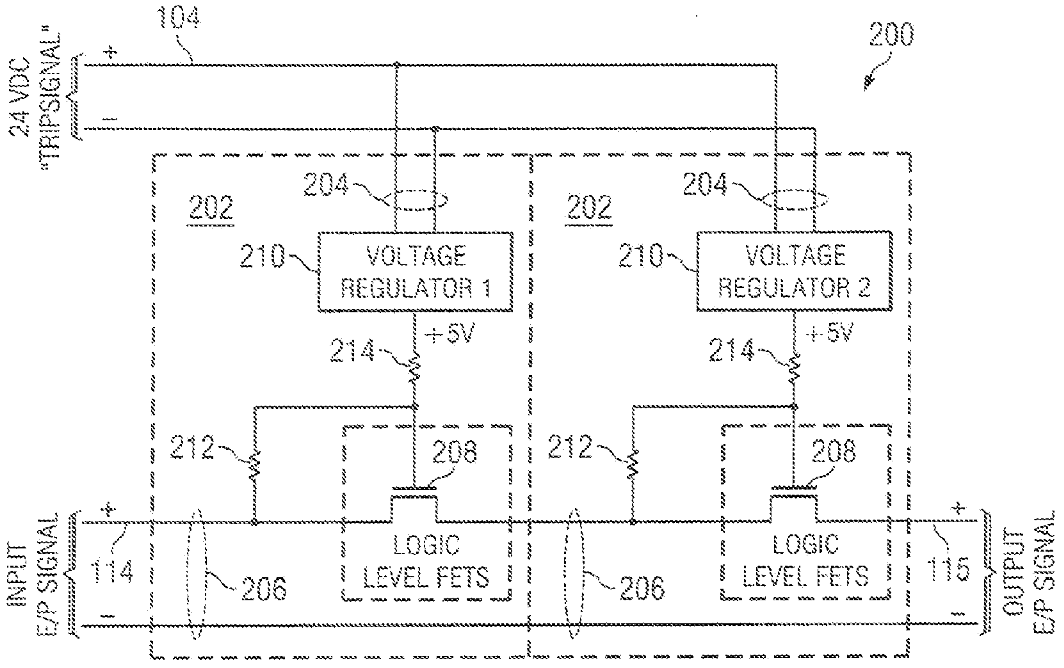
FIG. 2 is a circuit diagram of a particular implementation of the safety override circuit.

FIG. 1 illustrates an example implementation of a pneumatic positioner 100 that includes a safety override circuit 200. In this implementation, safety override circuit 200 restores the output pressure of an electric-to-pressure (E/P) converter 102 to atmospheric pressure in response to an activation condition. The pneumatic positioner 100 is controlled by an input signal 106, which is in turn used to power control circuitry 108 for the E/P converter 102. In particular implementations, the input signal 106 may be used to communicate other information to the pneumatic positioner 100 as well. In general, the control circuitry 108 causes the E/P converter 102 to produce a pressure at its output port 110, which is used to manipulate equipment under control (EUC) 112. If an unsafe condition is detected during operation, the safety override circuit 200 interrupts a control signal 115 for the E/P converter 102 while still allowing the input signal 106 to continue powering the control circuitry 108 for the E/P converter 102. Particular features of the depicted implementation are described in greater detail below.

The E/P converter 102 may be any electric-controlled device for adjusting the pressure at the output port 110 of the E/P converter 102. In this implementation, the E/P converter 102 produces pressure output using a pressurized air supply 116. A typical air supply 116 might be pressurized up to 150 psi. Commonly, an analog current signal (e.g., 0.1 mA-1.6 mA) is used to control the pneumatic positioner 102, in order to make the control signal compatible with levels typically used in other electric-controlled equipment. However, in principle, any current range may be used, or the E/P converter 102 can even be replaced by a voltage-controlled device or other electronically controlled equipment for producing an output pressure. Thus, although the description below may discuss the case of a current-to-pressure converter, it should be understood that the described implementations may be suitably modified to function with other electric-to-pressure converters or other signal-to-pressure converters as well. The output pressure of the E/P converter 102 may be applied to a pneumatic relay 118 that is used to produce a gain in the output pressure. The E/P converter 102 or the pneumatic relay 118 may have an exhaust 120 that allows the output port 110 to be vented to the atmosphere to restore the pressure at the output port 110 to atmospheric pressure.

The EUC 112 may be any device that can be mechanically manipulated by the output pressure of the E/P converter 102. For example, the EUC 112 may be a pneumatically-controlled valve that moves to various positions. Any suitable form of pneumatic or other mechanical connection between the pneumatic positioner 100 and the EUC 112 may be employed. In particular implementations, the EUC 112 has a "default state" or "safe state" to which the EUC 112 returns when the input pressure is restored to atmospheric pressure. For example, if the EUC 112 is a valve, the valve could go to an open position or a closed position in response to the input pressure returning to atmospheric levels.

The control circuitry 108 may include any hardware and/or software that is useful for the control or operation of the E/P converter 102. In the depicted implementation, the control circuitry 108 includes a processing module 122 coupled to, inter alia, an analog-to-digital (A/D) converter 124, a pressure controller 126, a HART modem 128, and a power converter 132, which extracts power from the input signal 106 to power various components of the pneumatic positioner 100. In general, the processing module 122 controls the pressure controller 126 for the E/P converter 102 based on the input signal 106 and information collected from a variety of sensors 130 (collectively referring to 130A, 130B, 130C, . . . , 130K). When an unsafe condition is detected (e.g., out of range signal, position, temperature, reference voltage, and/or pressure values, memory faults, and/or degradation of E/P converter and/or relay responsiveness during one or more checks), the processing module 122 may interrupt the control signals 114 output by the pressure controller 126. The processing module 122 may also generate an error notification signal 131. Further fault identification and analysis may be conducted via other communication devices (e.g., the HART modem 128).

The processing module 122 may be any collection of hardware and/or software useful for manipulating information according to any suitable algorithm or other set of instructions. The processing module 122 may include any number or type of processors, memory modules, interfaces, and the like to allow the processing module 122 to receive information from any other electronic device, to perform operations using that information, and to generate signals communicated to other electronic devices. In particular, the processing module 122 may include one or more microprocessors, microcontrollers, digital signal processors (DSPs), and application-specific integrated circuits (ASICs). The processing module 122 may include volatile or non-volatile information storage, examples of which include magnetic memory, flash memory, random access memory (RAM), and read-only memory (ROM). The processing module 122 may also use the HART modem 128 to receive messages, such as commands, communicated in the input signal 106. In particular implementations, the processing module 112 may include electronically erasable and programmable read-only memory (EEPROM) that is programmable based on commands received from the HART modem 128. Although the processing module 122 is illustrated as a digital processing module 122, other implementations could substitute analog circuitry performing one or more similar functions in its place.

The A/D converter 124 converts analog signals to digital as needed to allow the signals to be processed by the processing module 122. Various other A/D or D/A converters may also be employed to convert signals between the processing module 122 and other components into a form usable by those components. For example, if the processing module 122 sends messages to other HART devices, a D/A converter may be used to convert the digital output of the processing module 122 to 4-20 mA analog signals. Similarly, other interfaces, such as modems, network interface cards, and/or wireless transceivers, may be used to allow the processing module 122 to send and receive digital information from devices external to the pneumatic positioner 100.

The pressure controller 126 may be any hardware and/or software for generating control signals 114 for the E/P converter 102 in response to commands received from the processing module 122. The pressure controller 126 may receive feedback from a pressure sensor 130A coupled to the output port 110 of the E/P converter 102 and adjust the control signals 114 accordingly. The control signals 114 are communicated from the pressure controller 126 to the safety override circuit 200, allowing the safety override circuit 200 to produce control signals 115 for the electric-to-pressure converter 102.

In particular modes of operation, if an unsafe condition is not detected, control signals 115 may be substantially the same as control signals 114. If, however, an unsafe condition is detected, the safety override circuit 200 may generate control signals 115 to put the E/P converter 102 into a safe state. In certain implementations, this latter operation may include modifying controls signal 114. As used in this disclosure, “modify” may including boosting, attenuating, transforming, interrupting, converting, or otherwise manipulating the control signals 114 to produce a particular response from the E/P converter 102.

Sensors 130 monitor conditions associated with the pneumatic positioner 100 and/or the EUC 112. Examples of such sensors 130 include pressure sensors, temperature sensors, voltage sensors, and humidity sensors. An array of sensors 130 may be used to collect various types of information from various locations, as illustrated in the implementation of the pneumatic positioner 100 depicted in FIG. 1. In the depicted implementation, pressure sensor 130B monitors the pressure of the air supply 116 to the E/P converter 102. A pair of pressure sensors 130C and 130D monitor high and low pressures for the EUC 112. Another pressure sensor 130E monitors the atmospheric pressure of the environment around the pneumatic positioner 100. A voltage sensor 130F monitors a reference voltage level for the input signal 106. A temperature sensor 130G monitors an internal temperature for the pneumatic positioner 100. Temperature sensor 130G may be a thermocouple, a resistive temperature-sensitive device, a thermometer, or any other appropriate temperature sensing device. A position sensor 130H monitors the physical position of the EUC 112, which may be used, for example, to calibrate the pneumatic controller 100 or to detect failure in the EUC 112. Position sensor 130H may, for example, be a Hall-effect sensor that is magnetically coupled to the EUC 112 or other appropriate type sensor. A potentiometer 134 may also monitor the physical position of the EUC 112 by being physically coupled to thereto. A position sensor 130I monitors the resistance of the potentiometer 134. In particular implementations, the position sensor 130H and the potentiometer 134 may used to monitor the position of the EUC in different applications. For example, the position sensor 130H may be used when pneumatic controller 100 is mounted directly on a valve, and the potentiometer 134 may be used when the pneumatic controller 100 is mounted remotely from a valve. Voltage sensors 130J and 130K produce characteristic voltages in response to particular voltages signals used by the pneumatic controller 100, such as an external conditioning signal 136 or a reset signal 138 from the processing module 122. The information collected by the sensors 130 may be used for such tasks as providing feedback for the proper control of the E/P converter 102 or detecting an unsafe operating condition.

The sensors may, for example, be used to verify that the positioner 100 has control of valve position. A common problem with shutdown valves (e.g., valves that actuate in an emergency shutdown situation) is that the valve may not be actuated for a long period of time and may freeze in the normal (i.e., not shut down) condition. The verification may take place during normal safe operation in order to be confident that the valve will actuate when needed (e.g., when the trip signal is activated or when the input control signal is out of bounds). Since the verification is performed when there is no hazard, the problem may be repaired without shutting down the system. The verification may include moving the valve slightly or comparing actuator pressure to valve position or other diagnostic means to verify that the valve will actuate on demand.

The safety override circuit 200 may be any collection of electronic components that can interrupt or modify the communication of the control signals 114 to the E/P converter 102 without disrupting the ability of the input signal 106 to power other components of the pneumatic positioner 100. The safety override circuit 200 may be located apart from the control circuitry 108, such as on a separate printed circuit board, or it may be integrated with one or more components of the control circuitry 108. The safety override circuit 200 may also be implemented using digital components, analog components, or a combination thereof. In the depicted implementation, the trip signal 104 controls the operation of the safety override circuit 200. The trip signal 104 may be regulated by an external control mechanism, which may base its determinations on data received from various parts of a regulation process and/or facility, including the positioner 100. The safety override circuit 200 may, for example, be triggered in response to receiving the trip signal 104, detecting a change in the state of the trip signal 104 (such as going from high to low), detecting an interruption in the trip signal 104, or any of numerous other triggering methods based on the trip signal 104. The modification performed on the control signals 114 may be any suitable modification to cause the E/P converter 102 to perform an action associated with the “safe state” (examples of which include transitioning to a default state or freezing the current state of the E/P converter), which will depend on what type of control signal 115 produces the appropriate action. For example, some E/P converters will vent to the atmosphere when the control signal is interrupted, in which case interrupting the control signal would produce the safe state (assuming that venting to the atmosphere is the desired safe state).

In one mode of operation, the safety override circuit 200 receives the input signal 106 and provides it to the control circuitry 108. The control circuitry 108, powered by the input signal 106 using the power converter 132, generates an appropriate control signal 114 based at least partially on the input signal 106. The control signal 114 is provided to the safety override circuit 200, which provides the control signal 115 to the E/P converter 102. The processing module 122 monitors information from the sensors 130 during operation. If an unsafe condition is detected, such as any of the values measured by sensors 130 exceeding a safe range, the processing module 122 generates an error notification signal 131. The error notification signal may, for example, set the state of digital outputs. Also, the processing module may set the control signal 114 of the pressure controller 126 to produce a safe state for the E/P converter 102.

The safety override circuit 200 may also produce a safe state for the E/P converter 102. To accomplish this, the safety override circuit 200 may monitor the trip signal 104, the input signal 106, or any other appropriate condition-indicating signal. If one of these signals indicates an unsafe condition, the safety override circuit may drive the E/P converter 102 to safe state by overriding the control signal 114 from the control circuitry 108. The safety override circuit 200 may, however, still allow the input signal 106 to be provided to the control circuitry 108. Thus, the control circuitry 108 may continue to be powered. Thus, electronic functions of the positioner, such as system diagnostics and status reports, may continue to be provided.

FIG. 2 illustrates an example implementation of the safety override circuit 200. Safety override circuit 200 includes two duplicate override circuits 202 for increased reliability. Thus, if one of override circuits 202 fails, the other may still provide the safety function.

Each override circuit 202 has a first input 204 receiving the trip signal 104 and a second input 206 receiving the input E/P control signal 114 that is generated by the control circuitry 108 in response to the input signal 106. Each override circuit 202 places a transistor 208 in the path of the control signal 114. The transistors 208 may be any suitable current- or voltage-controlled electronic component that restricts or allows current flow in response to a control signal at a control terminal 210 (illustrated here as a voltage regulator). For example, the transistors 208 may be p-type or n-type field effect transistors (FETs), such as metal oxide semiconductor FETs (MOSFETs) that are controlled by a voltage applied to a gate terminal of the MOSFET. The voltage signal used to control the transistors 208 is the trip signal 104, stepped down by the voltage regulator 210 to a voltage level appropriate for the transistor 208. Thus, for example, a 24-V trip signal 104 could be stepped down for 5 V if the transistors 208 were 5-V MOSFETs. Resistors 212 and 214 are used in override circuits 202 to prevent current from the stepped-down trip signal 104 from significantly altering the control signals 114, from which the output E/P control signal 115 are produced. For example, resistor 212 may be selected to have a relatively high resistance value, such as 1 MΩ, to minimize current flow.

In operation, the transistors 208 allow current flow as long as the stepped-down voltage from the trip signal 104 is maintained. When the trip signal 104 is interrupted, the current flow through the transistors 208 is interrupted, thus interrupting the control signals 115 to the E/P converter 102. In response to the interruption of the control signals 115, the E/P converter 102 transitions to a safe state, such as venting to the atmosphere. Thus, the override circuits 202 provide an effective operation for stopping the control signals 114 in response to the trip signal 104.

Figure 3:
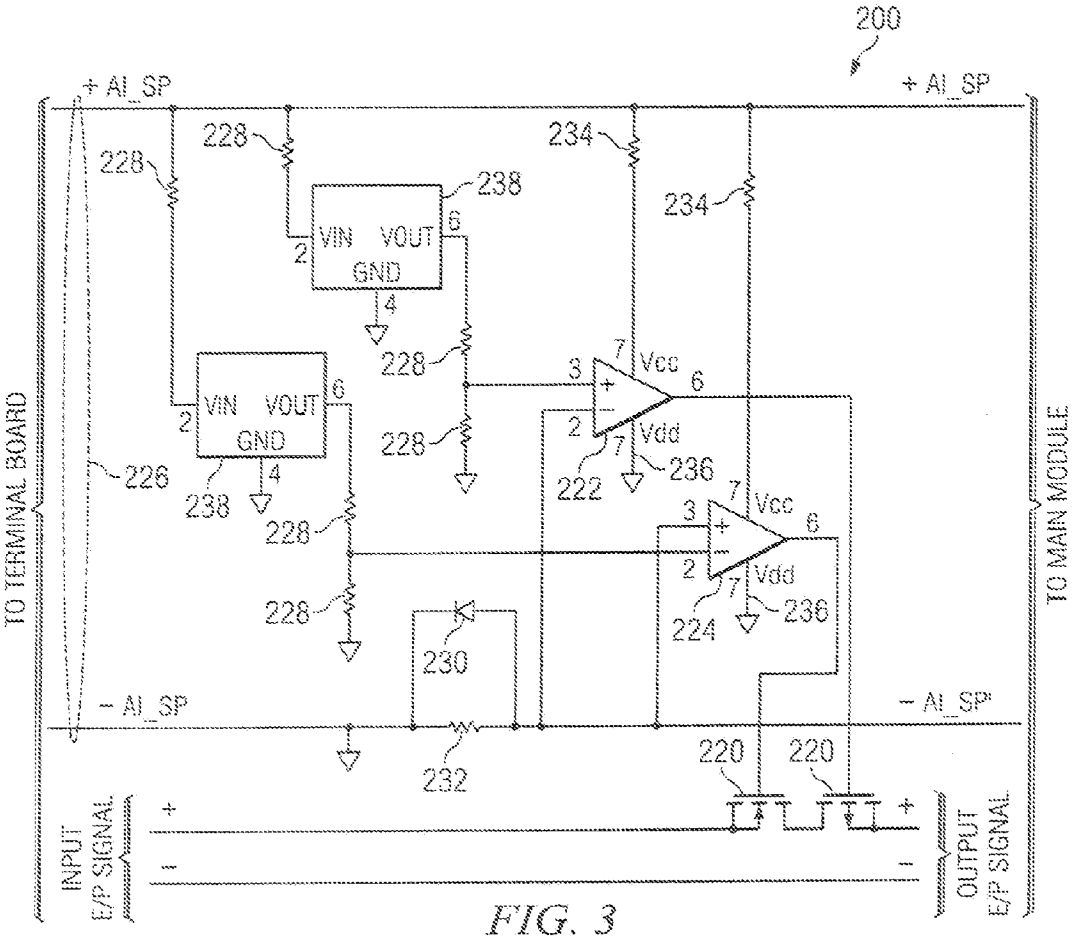
FIG. 3 is a circuit diagram of another implementation of the safety override circuit.

FIG. 3 illustrates another example implementation of safety override circuit 200. In this example implementation, two transistors 220 are each controlled by a respective comparator 222 or 224. Comparators 222 and 224 may be any circuitry for comparing a reference input signal to a threshold input signal and producing an output to control the respective transistor 220 in response to the comparison, such as the op-amp comparators illustrated in FIG. 3. In the depicted implementation, safety override circuit 200 receives an input current 226 generated from the input signal 106 to pneumatic positioner 100. Resistors 228 are arranged to produce a characteristic voltage drop representative of input current 226. Diode 230 and resistor 232 develop a voltage proportional to the input current 226. Voltage regulators 238 in combination with resistors 228 form a constant reference voltage against which the voltage across resistor 232 is compared. Resistors 234 and voltages 236 define the high and low values for the output of comparators 222 and 224.

In operation, comparators 222 and 224 each perform the comparisons of the characteristic voltage representative of the input current 226 to the respective reference voltages. If the characteristic voltage falls below the reference voltage, either because the input current 226 is too low or because one or more of voltage regulators 238 have shunted the input current 226 to ground because it was too high, comparator 222 or 224 turns off its respective transistor 220, thus interrupting current flow to the E/P converter 102. Because either comparator 222 or 224 can interrupt the current flow to the E/P converter 102, the example implementation of safety override circuit 200 depicted in FIG. 3 provides redundancy for added security. Because input current 226 used to trigger safety override circuit 200 is generated from the input signal 106 to pneumatic positioner 100, safety override circuit 200 may be triggered without the use of a separate trip signal 104.

In particular implementations, the safety features illustrated by FIGS. 2-3 may be provided in one safety override circuit (e.g., on the same circuit board). In application, however, it may be that only one of the safety features is used. Furthermore, although the safety override circuits are illustrated as having redundancy through having duplicate circuits, it may be advantageous to provide redundancy through non-duplicate circuits, which may reduce the chance of both circuits being affected by the same condition. In certain implementations, however, redundancy is not required.

Figure 4:
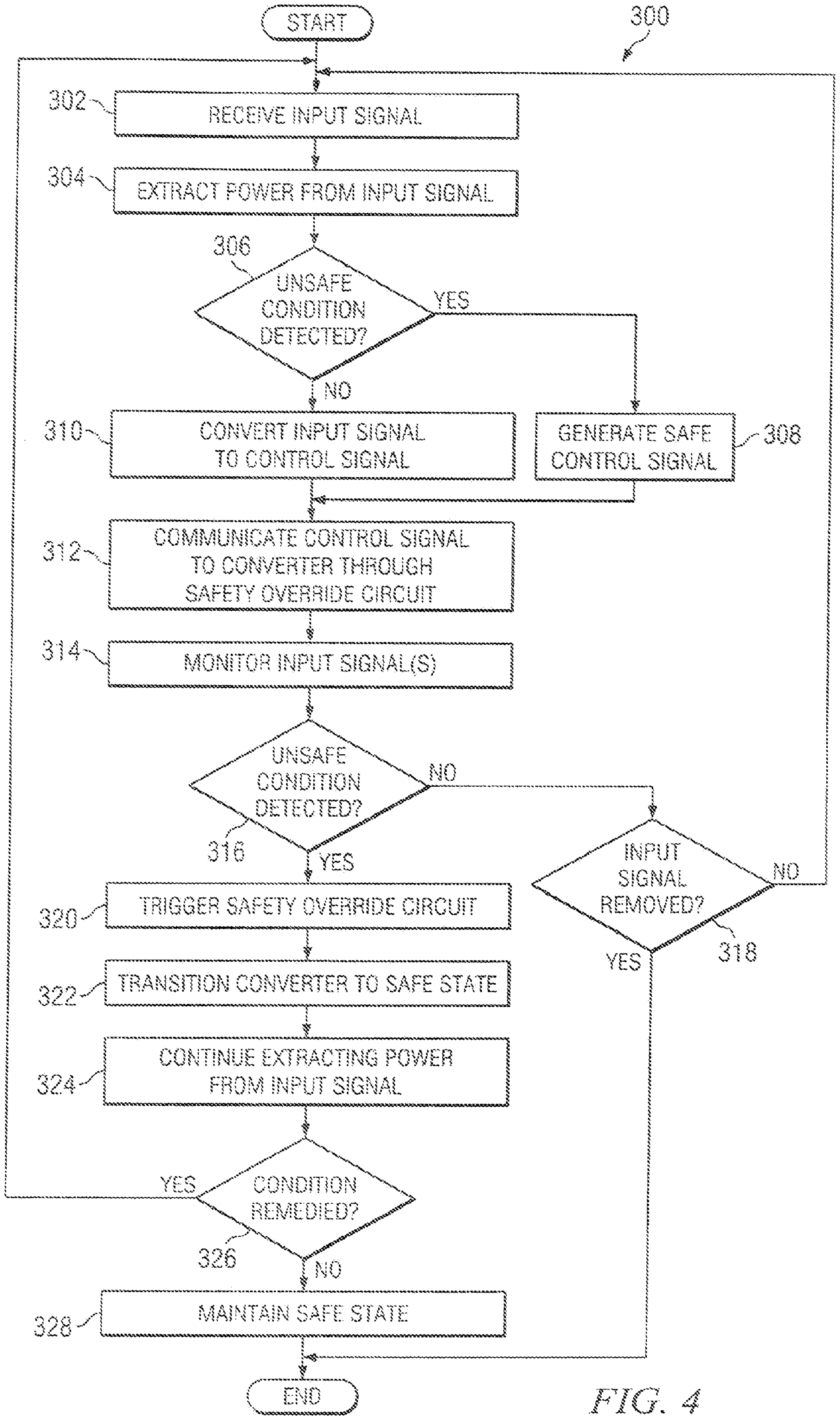
FIG. 4 is a flow chart illustrating an example process for implementing a safety override in a pneumatic positioner.

FIG. 4 illustrates an example process 300 for implementing a safety override in a pneumatic positioner. Process 300 begins with receiving an input signal for the pneumatic positioner (operation 302). In one example, the input signal may be a 4-20 mA analog control signal. Process 300 continues with extracting power from the input signal to power control circuitry (operation 304) and checking for an unsafe condition (operation 306). An unsafe condition may, for example, be an out of range sensor value. If an unsafe is detected, process 300 calls for producing a safe E/P control signal (operation 308). If, however, an unsafe condition has not been detected, process 300 calls for converting the input signal to an E/P control signal (operation 310).

Process 300 continues with communicating the E/P control signal through a safety override circuit to the E/P converter (operation 312). Process 300 also calls for monitoring the input signal(s) for the pneumatic positioner (operation 314). The input signal(s) may include a control signal, a trip signal, or any other signal provided to the positioner. If an unsafe condition is not detected (operation 316), operations 302-314 are repeated until detection of an unsafe condition or the removal of input signal (operation 318). An unsafe condition may, for example, be the loss of an input signal (e.g., a 24 V trip signal) and/or an out of range control signal (e.g., a signal that is less than 4 mA when a 4-20 mA signal is being used).

In response to detection of an unsafe condition, process 300 calls for triggering a safety override circuit (operation 320). The triggering of the safety override circuit causes the E/P converter to transition to a safe state (operation 322), such as venting an electric-to-pressure converter to the atmosphere, while power continues to be extracted from the input signal (operation 324). If it is determined that the unsafe condition has been corrected (operation 326), as indicated by user intervention, restoration of trip signal 104, or numerous other possible indicators, the pneumatic positioner may return to operations 302-314. Otherwise, the safe state may be maintained for some amount of time (operation 328) until outside intervention is applied to restore operation of the pneumatic positioner.

The preceding process of implementing a safety override in a pneumatic positioner is one of numerous possible processes. In implementing such processes, particular operations of the described method may be rearranged or omitted and/or additional steps may be added. For example, a safe control signal may not be generated in response to a processor determined fault condition. As another example, notification may be provided to a user when an unsafe condition is detected. Other modes of operation consistent with any of the various implementations of the pneumatic positioner 100 described above are also included within possible methods for implementing a safety override in a pneumatic positioner. Consequently, the process described above is presented as only one illustrative example, rather than an exhaustive description of possible methods.

Although this disclosure has described certain implementations and generally associated methods, alterations and permutations of these implementations and methods will be apparent to those skilled in the art. For example, different circuitry may be used to perform the recited functions, different forms of control signals may be used, and control signals may be converted, processed, or otherwise manipulated in different ways. Accordingly, the above description of example implementations does not exclusively define the scope of the present invention. Therefore, in addition to the described implementations, other changes, substitutions, and alterations may be included within the scope of the appended claims, which are to be used to measure the scope of the currently claimed inventive concept.

What is claimed is:

1. A pneumatic positioner, comprising:

a converter operable to produce a pressure at an output port in response to a control signal;

control circuitry powered using an input control signal and operable to generate the control signal for the converter based at least partially on the input control signal; and a safety override circuit operable to receive the input control signal; wherein the safety override circuit is further operable to receive the control signal for the converter, the safety override circuit further operable to modify the control signal for the converter in response to an externally generated trip signal, the modified control signal causing the converter to transition into a safe state and the safety override circuit allowing the control circuitry to continue being powered by the input control signal while the converter is in the safe state.

2. The positioner of claim 1, further comprising a valve controlled by the pressure produced by the converter.

3. The positioner of claim 1, wherein the safety override circuit comprises a comparator operable to compare a characteristic voltage representative of the externally generated trip signal to a reference voltage.

4. The positioner of claim 1, wherein the control circuitry is operable to convey and receive digital signals from at least one external device.

5. The positioner of claim 1, wherein the converter transitions to the safe state by venting the output port to atmospheric pressure.

6. The positioner of claim 1, further comprising at least one sensor operable to detect an unsafe operating condition for the pneumatic positioner, wherein the control circuitry can modify the control signal to transition the converter to a safe state based on the detection.

7. The positioner of claim 1, wherein modifying the control signal for the converter includes one of the following: boosting, attenuating, transforming, interrupting, converting, or manipulating the control signal for the converter.

8. The positioner of claim 1, wherein the safety override circuit comprises a comparator operable to determine that a current level of the externally generated control signal is outside a threshold current level.

9. A method performed at a pneumatic positioner, comprising:

receiving an input control signal for control circuitry of the pneumatic positioner at a safety override circuit;

powering control circuitry of the pneumatic positioner using the input control signal, the input control signal supplied to the control circuitry from the safety override circuit;

generating a control signal for a signal-to-pressure converter with the control circuitry based at least partially on the input control signal;

detecting an unsafe operating condition for the pneumatic positioner based on detecting that an input trip signal received at the safety override circuit has activated;

modifying the generated converter control signal at the safety override circuit in response to detecting the unsafe operating condition, the modified converter control signal causing the converter to transition to a safe state; and allowing the control circuitry to continue being powered by the input control signal while the converter is in the safe state.

10. The method of claim 9, further comprising venting an output port of the converter to atmospheric pressure in response to the modified converter control signal.

11. The method of claim 9, wherein detecting an unsafe operating condition based on an input signal for the positioner comprises detecting that a voltage level of the input trip signal received at the safety override circuit is outside a threshold level.

12. The method of claim 11, wherein detecting that a voltage level of the input trip signal is outside a threshold level comprises:

generating a characteristic voltage based on the input trip signal;

comparing a reference voltage to the characteristic voltage; and determining that the voltage level of the input trip signal has dropped below the threshold level based on the comparison.

13. The method of claim 9, further comprising:

sensing an unsafe operating condition for the pneumatic positioner; and modifying the converter control signal at the safety override circuit, the modified converter control signal causing the converter to transition to a safe state based on the detection.

14. A pneumatic positioner, comprising:

a converter operable to produce a pressure at an output port in response to a control signal;

control circuitry powered using an input control signal and operable to generate the control signal for the converter based at least partially on the input control signal; and a safety override circuit operable to receive the input control signal and the converter control signal, the safety override circuit further operable to supply the input control signal to the control circuitry and to modify the control signal for the converter in response to the input control signal, the modified control signal causing the converter to transition into a safe state and the safety override circuit allowing the control circuitry to continue being powered by the input control signal while the converter is in the safe state.

15. The positioner of claim 14, wherein modifying the control signal for the converter includes one of the following: boosting, attenuating, transforming, interrupting, converting, or manipulating the control signal for the converter.

16. The positioner of claim 14, further comprising a valve controlled by the pressure produced by the converter.

17. The positioner of claim 14, wherein the safety override circuit comprises a comparator operable to compare a characteristic voltage representative of the input control signal to a reference voltage.

18. The positioner of claim 14, wherein the safety override circuit comprises a comparator operable to determine that a current level of the input control signal is outside a threshold current level.

19. The positioner of claim 14, wherein the converter transitions to the safe state by venting the output port to atmospheric pressure.

20. The positioner of claim 14, further comprising at least one sensor operable to detect an unsafe operating condition for the pneumatic positioner, wherein the control circuitry can modify the control signal to transition the converter to a safe state based on the detection.

21. A method performed at a pneumatic positioner, comprising:

receiving an input control signal for control circuitry of the pneumatic positioner at a safety override circuit;

powering control circuitry of the pneumatic positioner using the input control signal, the input control signal supplied to the control circuitry from the safety override circuit;

generating a control signal for a signal-to-pressure converter with the control circuitry based at least partially on the input control signal;

detecting an unsafe operating condition for the pneumatic positioner based at least in part on the input control signal received at the safety override circuit;

modifying the generated converter control signal at the safety override circuit in response to detecting the unsafe operating condition, the modified converter control signal causing the converter to transition to a safe state; and allowing the control circuitry to continue being powered by the input control signal while the converter is in the safe state.

22. The method of claim 21, further comprising venting an output port of the converter to atmospheric pressure in response to the modified converter control signal.

23. The method of claim 21, wherein detecting an unsafe operating condition based on an input signal for the positioner comprises detecting that a current level of the input control signal received at the safety override circuit is outside a threshold level.

24. The method of claim 23, wherein detecting that a current level of the input control signal is outside a threshold level comprises:

generating a characteristic voltage based on the input control signal;

comparing a reference voltage to the characteristic voltage; and determining that the current level of the input control signal has dropped below the threshold level based on the comparison.

25. The method of claim 21, wherein modifying the generated converter control signal includes one of the following: boosting, attenuating, transforming, interrupting, converting, or manipulating the control signal for the converter.

26. The method of claim 21, further comprising:

sensing an unsafe operating condition for the pneumatic positioner; and modifying the converter control signal at the safety override circuit, the modified converter control signal causing the converter to transition to a safe state based on the detection.

* * * * *